United States Patent
Borkowski et al.

(10) Patent No.: US 7,000,979 B2
(45) Date of Patent: Feb. 21, 2006

(54) VEHICLE COWL STRUCTURE WITH VENT PIPE

(75) Inventors: Slav Borkowski, Commerce Township, MI (US); Youichi Yamamoto, West Bloomfield, MI (US)

(73) Assignee: Nissan Technical Center North America, Inc., MI (US)

( * ) Notice: Subject to any disclaimer, the term of this patent is extended or adjusted under 35 U.S.C. 154(b) by 0 days.

(21) Appl. No.: 10/740,596

(22) Filed: Dec. 22, 2003

(65) Prior Publication Data

US 2005/0134089 A1 Jun. 23, 2005

(51) Int. Cl.
*B62D 25/08* (2006.01)

(52) U.S. Cl. .......................... 296/192; 296/208; 296/29

(58) Field of Classification Search ................ 296/192, 296/201, 208, 209, 29, 96.11; 454/147, 174
See application file for complete search history.

(56) References Cited

U.S. PATENT DOCUMENTS

| | | | |
|---|---|---|---|
| 4,071,273 A | | 1/1978 | Hack et al. |
| 4,232,710 A | * | 11/1980 | Gallo et al. .................... 138/39 |
| 4,391,551 A | * | 7/1983 | Belcher ........................ 405/43 |
| 4,533,015 A | * | 8/1985 | Kojima ........................ 181/280 |
| 4,772,066 A | * | 9/1988 | Leschke et al. ............. 296/208 |
| 4,819,550 A | * | 4/1989 | Ioka ............................ 454/147 |
| 4,869,546 A | * | 9/1989 | Sato ............................ 296/192 |
| 5,127,703 A | | 7/1992 | Takahashi |
| 5,145,457 A | * | 9/1992 | Tanigaito et al. ........... 454/147 |
| 5,248,218 A | * | 9/1993 | Belcher ........................ 405/43 |
| 5,322,551 A | * | 6/1994 | Payne ........................... 96/189 |
| 5,679,074 A | | 10/1997 | Siegel |
| 5,709,309 A | | 1/1998 | Gallagher et al. |
| 6,193,305 B1 | * | 2/2001 | Takahashi ................... 296/192 |
| 6,633,089 B1 | * | 10/2003 | Kimura ..................... 307/10.1 |
| 6,682,119 B1 | * | 1/2004 | Droulez ..................... 296/39.3 |
| 2003/0178873 A1 | | 9/2003 | Kato et al. |

* cited by examiner

*Primary Examiner*—H. Gutman
(74) *Attorney, Agent, or Firm*—Shinjyu Global IP Counselors, LLP

(57) ABSTRACT

A vehicle cowl structure basically comprises a cowl panel and a vent pipe disposed in the cowl panel at a low drainage point on a lateral wall portion of the cowl panel. The vent pipe includes an opening that is split by a divider into an upper air passageway and a lower water drain passageway. The vent pipe also includes a mounting flange that contacts with an interior surface of the lateral wall portion and retaining projections to create a snap-fit between the vent pipe and the drainage aperture of the cowl panel. The vent pipe is also inserted into a hole formed in a vehicle body section such that a retaining member installed over the vent pipe contacts the vehicle body section around the hole and seals a space between the vent pipe and the hole of the vehicle body member.

29 Claims, 11 Drawing Sheets

VEHICLE COWL STRUCTURE WITH VENT PIPE

BACKGROUND OF THE INVENTION

1. Field of the Invention

The present invention generally relates to a vehicle cowl structure with vent pipe. More specifically, the present invention relates to a vehicle cowl structure having a cowl panel with a vent pipe that includes an upper passageway for introducing air into the cowl panel and a lower passageway for draining water from the cowl panel.

2. Background Information

Generally, a vehicle includes a cowl structure that is disposed in an area between a front windshield and a fire wall of an engine room to divide the engine room and an interior part of the vehicle. The cowl usually comprises a cowl panel and a cowl louver provided on the cowl panel to cover an upward opening of the cowl panel. The cowl louver is provided with air inlets so that an outside air is drawn to the cowl. The air drawn to the cowl is used for the air conditioning and/or directly sent to the vehicle interior through a duct coupling the cowl and the vehicle interior. Since the air inlets of the cowl louver are usually open to the air and let rainwater as well as the outside air into the cowl panel, the cowl structure usually provides a water drainage system in the cowl structure to drain the water introduced to the cowl structure.

For example, U.S. Pat. No. 5,127,703 discloses a cowl structure in which a cowl panel includes a drain hole that is provided in the lowest position of the horizontal base of the cowl panel. Moreover, U.S. Pat. No. 6,086,144 discloses a cowl panel having a dam portion provided at a front end of the cowl panel to guide the water toward a recess formed in the side portion of the cowl panel. The recess has an opening that is open to inside portion of a hood ledge. The water led to the recess drops from the opening into the inside of the hood ledge and drained from drain openings provided with the hood ledge.

In view of the above, it will be apparent to those skilled in the art from this disclosure that there exists a need for an improved vehicle cowl structure that introduces air into the cowl structure without interfering with draining water from the cowl structure. This invention addresses this need in the art as well as other needs, which will become apparent to those skilled in the art from this disclosure.

SUMMARY OF THE INVENTION

It has been discovered that in some conventional cowl structures, when the air inlets of the cowl louver is covered by, for example, snow in the winter time, sufficient outside air cannot be introduced into the cowl structure for the vehicle ventilation system through the air inlets. In such a case, the outside air is drawn into the cowl structure from any openings in the cowl structure including the drainage openings for draining the water from the cowl structure. At the same time that the outside air is drawn into the cowl structure from the drainage openings, the snow on the cowl louver melts and water begins to collect on the cowl panel. However, the outside air being sucked into the cowl structure through the water drainage openings interferes with the draining of the water from the cowl structure to the outside. Consequently, the water is accumulated in the cowl structure.

One object of the present invention is to provide a cowl structure that overcomes this problem of draining water from the cowl structure when the outside air being sucked into the cowl structure through the water drainage openings of the cowl structure.

In accordance with one aspect of the present invention, a vehicle cowl structure is provided that basically comprises a cowl panel and a vent pipe disposed in the cowl panel at a low drainage point on a lateral wall portion of the cowl panel. The vent pipe includes an opening that is split by a divider into an upper passageway and a lower passageway. The vent pipe also includes a mounting flange that contacts with an interior surface of the lateral wall portion and retaining projections to create a snap-fit between the vent pipe and the drainage aperture of the cowl panel. The vent pipe is also inserted into a hole formed in a vehicle body section such that a retaining member installed over the vent pipe contacts the vehicle body section around the hole and seals a space between the vent pipe and the hole of the vehicle body member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1–5, a portion of a vehicle body 10 is illustrated that is equipped a vehicle cowl structure 12 in accordance with a preferred embodiment of the present invention. The precise construction of the vehicle body 10 is not important to the present invention. Thus, simplified illustrations of the vehicle body 10 will be used to describe the present invention. Also since the majority of the structure of the vehicle 10 is conventional and/or not important to the present invention, only those parts or portions of the vehicle body 10 that relate to the present invention will be discussed or illustrated herein for the sake of brevity.

Figure 1:
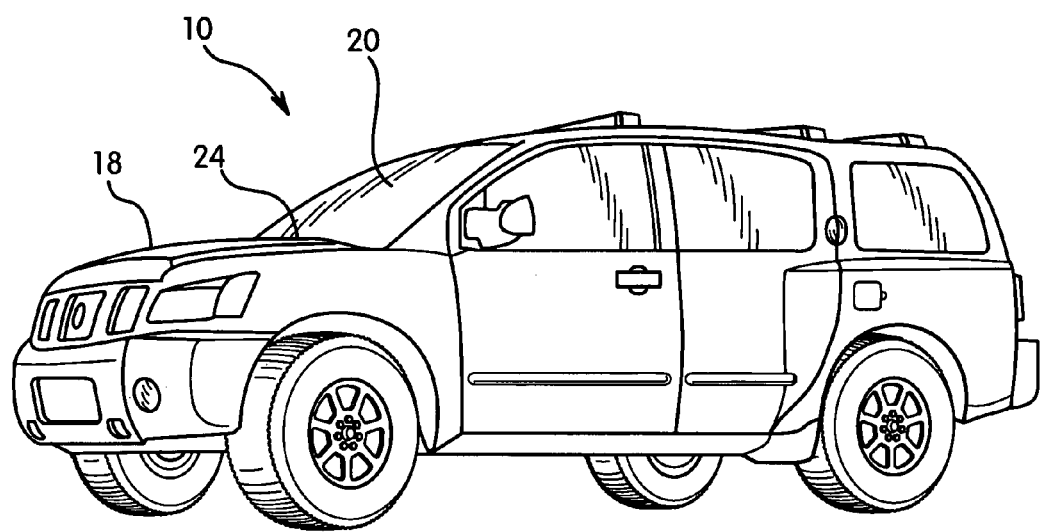
FIG. 1 is a perspective view of a vehicle having a vehicle cowl structure with vent pipe in accordance with the present invention.
Figure 2:
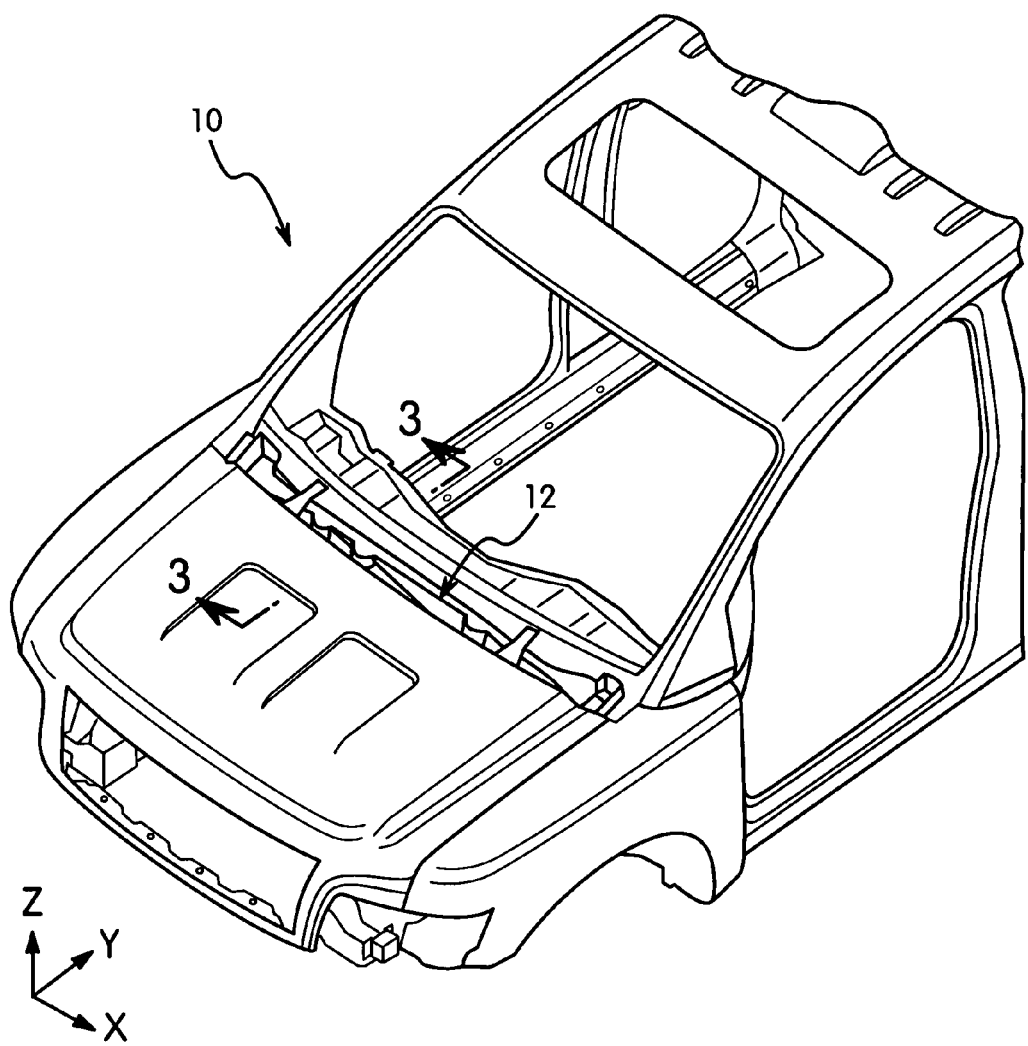
FIG. 2 is a top perspective view of the vehicle illustrated in FIG. 1 with portions removed to show the vehicle cowl structure with vent pipe in accordance with the present invention.
Figure 3:
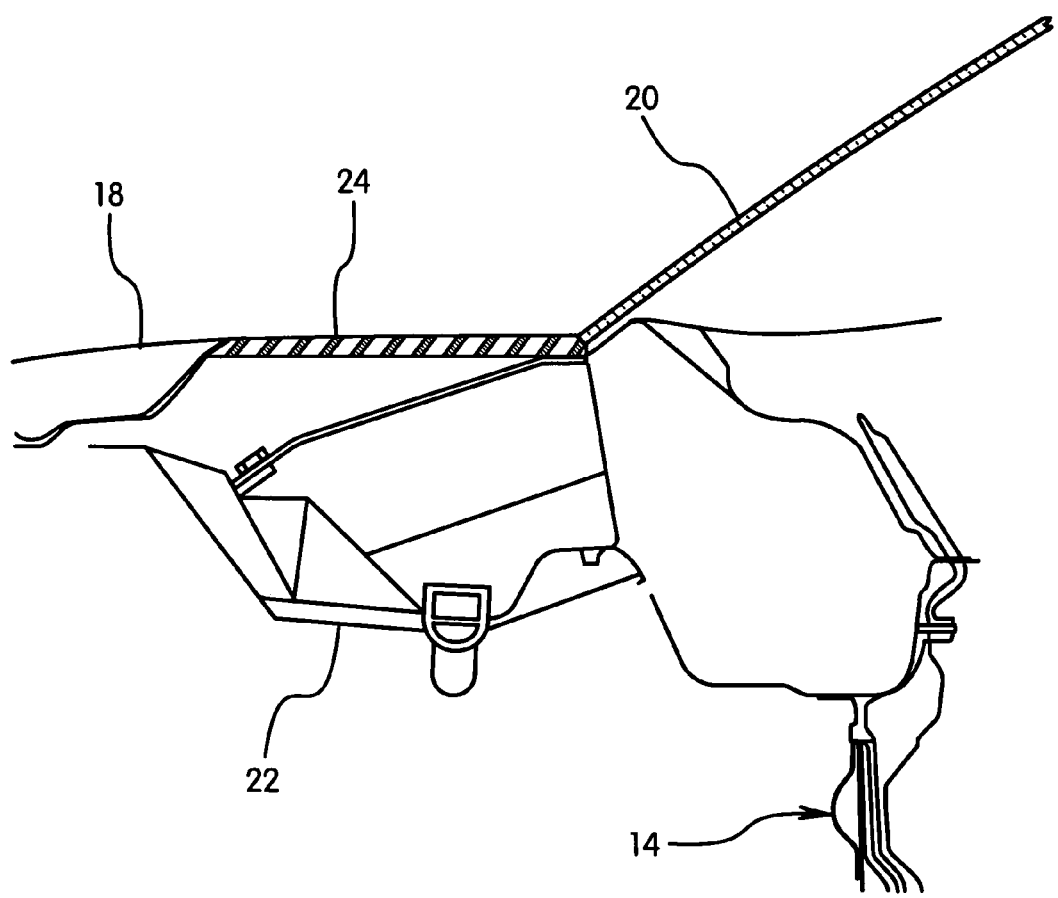
FIG. 3 is a partial schematic cross sectional view of the vehicle and the cowl panel as seen along section line 3—3 of FIG. 2.

As seen in FIGS. 2 and 3, the vehicle cowl structure 12 is configured and arranged to be installed in an area of the vehicle body 10 that is in front of a fire wall structure 14 dividing an interior part of the vehicle from an engine compartment. More specifically, the vehicle cowl structure 12 is fixedly mounted to a pair of hood ledges 16 at its lateral side ends and fixedly mounted to the fire wall structure 14 at its rearward side. Preferably, the vehicle cowl structure 12 is configured and arranged to extending into an area of the vehicle body 10 that is between a vehicle hood 18 and a vehicle windshield 20 such that the vehicle cowl structure 12 provides intake air to the vehicle.

The entire configuration of the vehicle cowl structure 12 is not important to the present invention. Thus, simplified illustrations will be used to describe those portions of the vehicle cowl structure 12 that are not particularly important to the present invention, the vehicle cowl structure 12 includes a cowl panel 22 that forms a part of an air intake system for the ventilation system (not shown) of the vehicle. The cowl panel 22 is generally installed in the area between the vehicle hood 18 and the vehicle windshield 20. A cowl louver 24 of the vehicle cowl structure 12 is provided directly above the cowl panel 22 in the area between the vehicle hood 18 and the vehicle windshield 20 to cover an upward opening of the cowl panel 22. The cowl louver 24 is provided with air inlets so that an outside air is drawn to the vehicle cowl structure 12. The air drawn to the vehicle cowl structure 12 is used for the air conditioning and/or directly sent to the vehicle interior through a duct system (not shown) that couples the cowl panel 22 and the vehicle interior. Since the air inlets of the cowl louver 24 are open to the air, water often enters through the cowl louver 24 and collects on the cowl panel 22. Thus, the cowl panel 22 is configured and arranged to drain the water that collects on the cowl panel 22.

Figure 4:
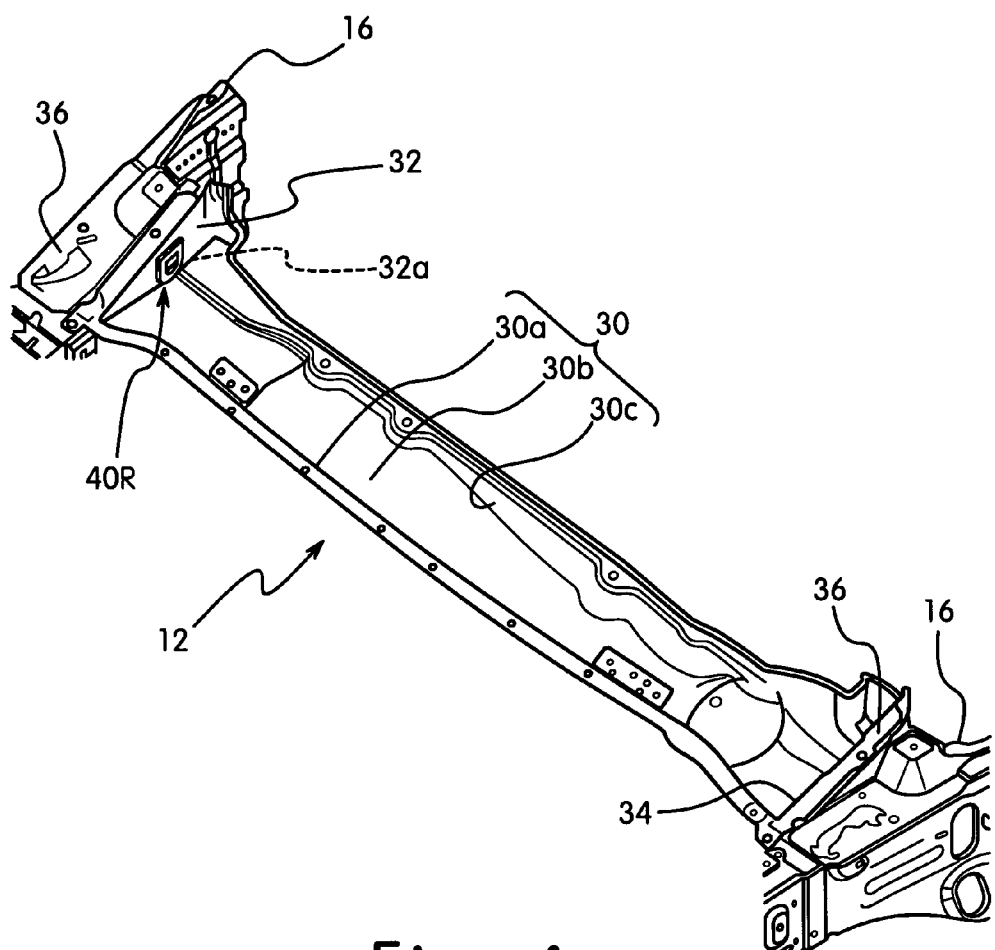
FIG. 4 is a top schematic perspective view of the cowl panel coupled to the hood ledges of the vehicle illustrated in FIGS. 1–3.
Figure 5:
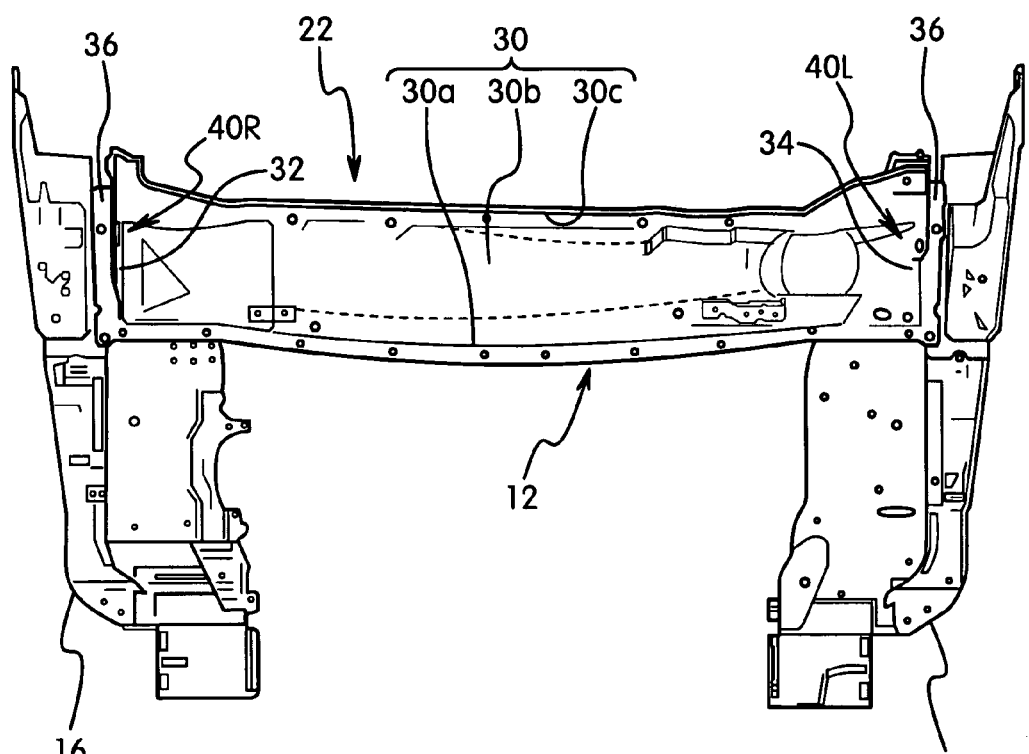
FIG. 5 is a top schematic plan view of the cowl panel coupled to the hood ledges of the vehicle illustrated in FIGS. 1–4.
Figure 6:
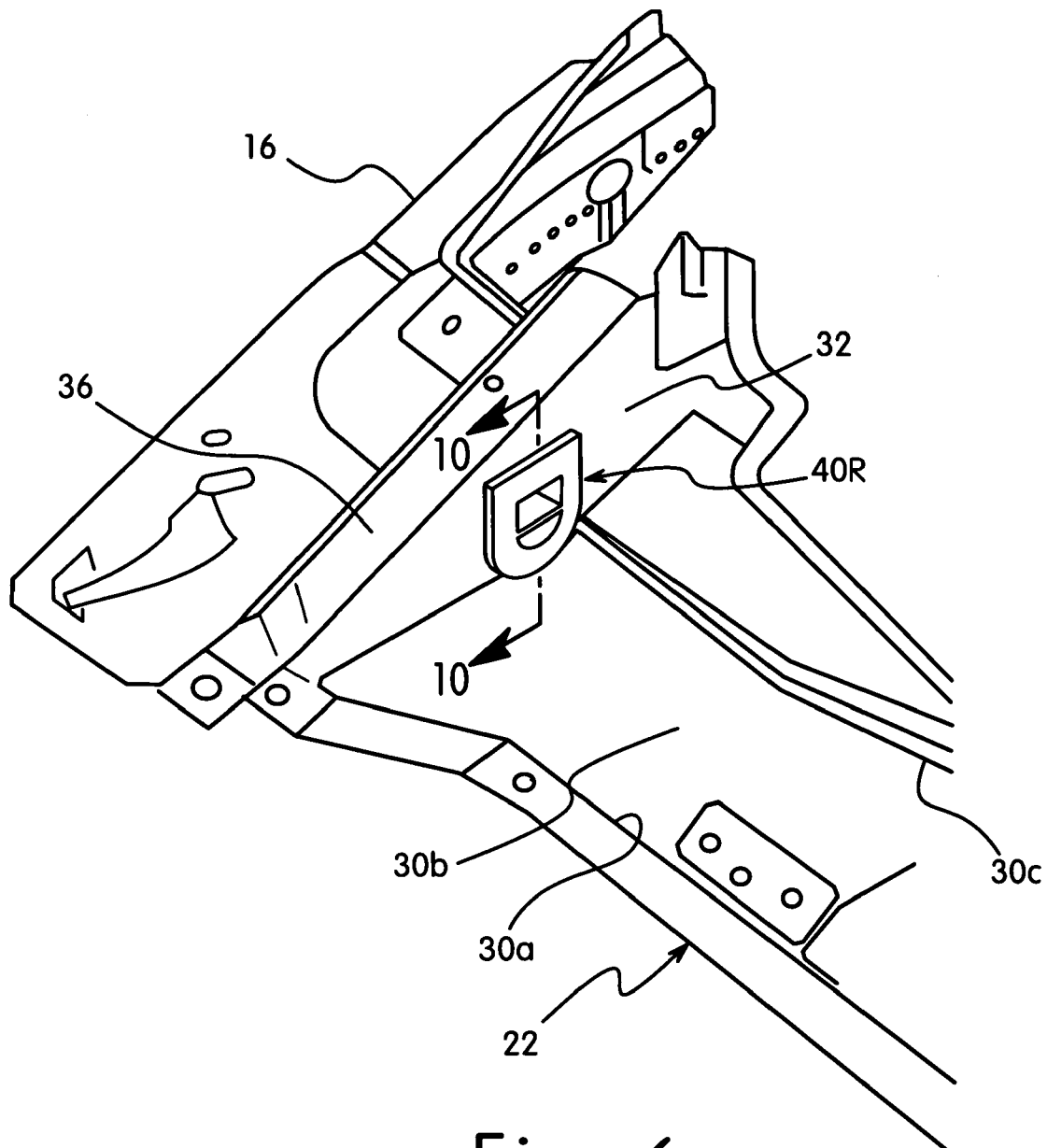
FIG. 6 is an enlarged partial schematic perspective view of the right portion of the cowl panel coupled to the right hand side hood ledge of the vehicle body of the vehicle illustrated in FIGS. 1–3 in accordance with the present invention.
Figure 7:
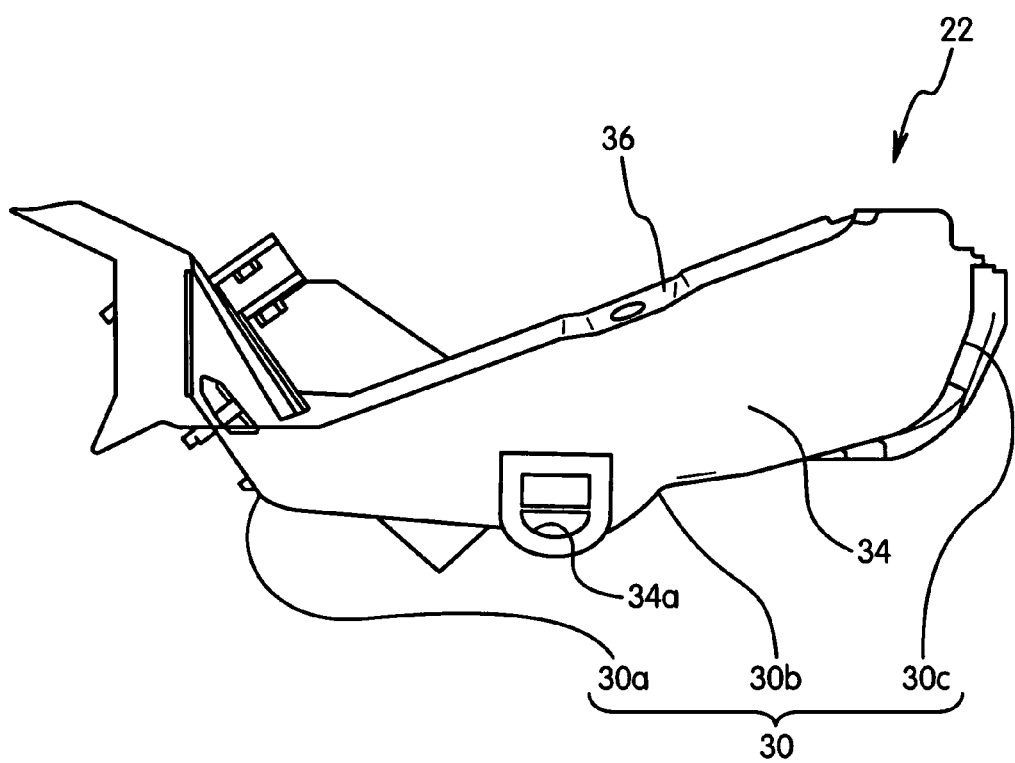
FIG. 7 is a left end elevational view of the cowl panel of the vehicle cowl structure with vent pipe removed for purposes of illustration.

As seen in FIGS. 4 and 5, the cowl panel 22 is preferably constructed as a one-piece, unitary member that is formed as a contoured sheet element. Preferably, the cowl panel 22 is constructed from a rigid lightweight material such as a hard rigid plastic material. Basically, the cowl panel 22 includes a trough shaped center wall section 30, a first lateral end wall section 32, a second lateral end wall section 34 and a mounting flange 36. The cowl panel 22 has a first vent pipe 40R disposed in the first lateral end wall section 32 of the cowl panel 22 at a first low drainage point of the cowl panel 22, and a second vent pipe 40L disposed in the second lateral end wall section 34 of the cowl panel 22 at a second low drainage point of the cowl panel 22. The first and second vent pipes 40R and 40L are preferably separate elements form the cowl panel 22. However, it will become apparent to those skilled in the art from this disclosure that the cowl panel 22 and the first and second vent pipes 40R and 40L could be constructed as a one-piece, unitary member as needed and/or desired. Of course, some of the benefits of using the first and second vent pipes 40R and 40L as separate elements form the cowl panel 22 will not be attained when the cowl panel 22 and the first and second vent pipes 40R and 40L are integrated as a single element prior to installation of the cowl panel 22 to the vehicle body 10.

The trough shaped center wall section 30 preferably includes a front dam portion 30a, a bottom wall portion 30b and a rear dam portion 30c. The front and rear dam portions 30a and 30c extend upwardly and outwardly from the bottom wall portion 30b so as to define a generally trough shaped transverse cross section. Thus, water that collects on the cowl panel 22 is diverted to the bottom wall portion 30b. The bottom wall portion 30b preferably is sloped from a center section to its two lateral ends. In other words, when the water collects on the bottom wall portion 30b of the cowl panel 22, the water is directed towards the first and second lateral end wall sections 32 and 34. Thus, the first low drainage point of the cowl panel 22 is formed at the intersection of the first lateral end of the bottom wall portion 30b and the first lateral end wall section 32, while the second low drainage point of the cowl panel 22 is formed at the intersection between the second lateral end of the bottom wall portion 30b and the second lateral end wall section 34. Accordingly, the upper surface of the bottom wall portion 30b is concaved in the front to aft direction of the vehicle and substantially convex in the side to side direction of the vehicle.

The first and second lateral end wall sections 32 and 34 are substantially identical to each other, but are mirror images. Of course, the first and second lateral end sections 32 and 34 can have a slightly different configuration depending upon the construction of the vehicle body, i.e., the configuration of the right and left hood ledges 16. In any event, the first and second lateral end sections 32 and 34 extend substantially vertically from the first and second lateral ends of the center wall section 30 so as to close off the lateral ends of the center wall section 30. The first lateral end section 32 has a first drainage aperture 32a disposed at its lower edge where the first lateral end wall section 32 connects with the bottom wall portion 30b. Preferably, the first drainage aperture 32a has a D-shaped configuration in which the flat edge portion of the D-shape is arranged substantially horizontally and the curved portion of the D-shape has its center point substantially located at the first low drainage point of the cowl panel 22. Similarly, the second lateral end section 34 has a second drainage aperture 34a (not shown) formed at the lower edge of the second lateral end section 34 adjacent to the bottom wall portion 30b as seen in FIG. 4. The second drainage aperture 34a preferably also has a D-shaped configuration with the flat portion of the D-shape being arranged horizontally and the center of the curve of the D-shape being located at the second low drainage point of the cowl panel 22. Accordingly, the first and second drainage apertures 32a and 34a are arranged at the first and second drainage points of the cowl panel 22 such that water collecting on the cowl panel 22 can be efficiently drained from the cowl panel 22.

The first and second drainage apertures 32a and 34a are dimensioned to receive the first and second vent pipes 40R and 40L therein as explained below in more detail. Preferably, the first and second vent pipes 40R and 40L are snap fitted into the first and second drainage aperture 32a and 34a respectively. As explained below, the cowl panel 22 with the vent pipes 40R and 40L can be partially preassembled prior to attaching the cowl panel 22 to the rest of the vehicle body 10. In other words, the first and second vent pipes 40R and 40L are loosely retained in the first and second drainage apertures 32a and 34a prior to mounting the cowl panel 22 to the right and left hood ledges 16. Once the cowl panel 22 is fixedly mounted to the right and left hood ledges 16, the first and second vent pipes 40R and 40L can be completely inserted into the first and second drainage apertures 32a and 34a, respectively such that the first and second vent pipes 40R and 40L are non-movably retained in the cowl panel 22.

Preferably, the first and second vent pipes 40R and 40L are identical. Thus, for the sake of brevity, only one of the vent pipes 40R and 40L will be discussed and illustrated in detail herein. Of course, it will be apparent to those skilled in the art from this disclosure that the description of the illustrated vent pipe applies also to the other vent pipe.

Figure 8:
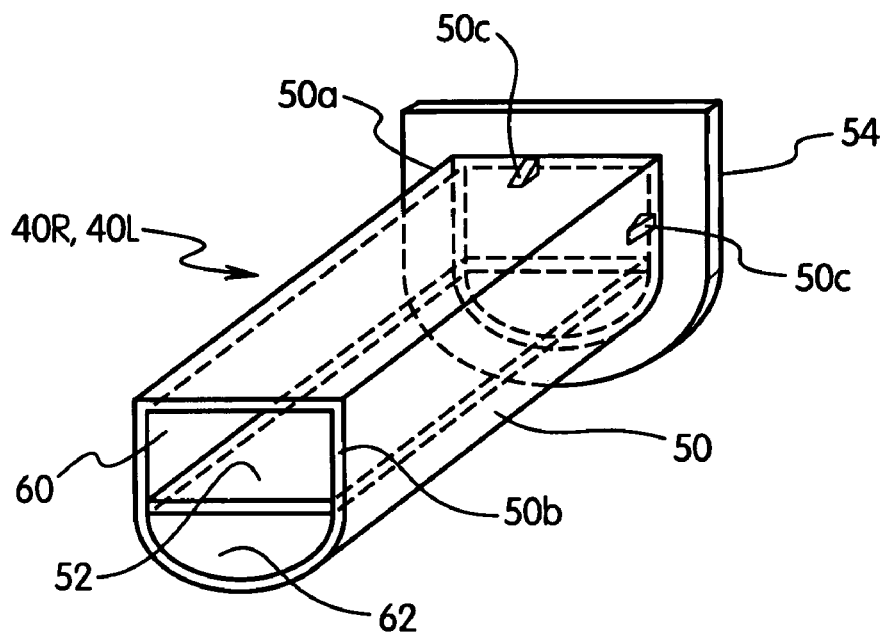
FIG. 8 is an enlarged top perspective view of the vent pipe for the vehicle cowl structure in accordance with the present invention.
Figure 9:
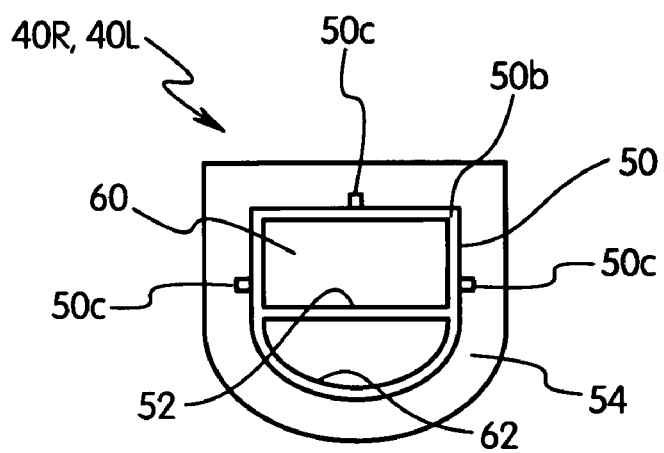
FIG. 9 is an enlarged end elevational view of the vent pipe for the vehicle cowl structure illustrated in FIG. 8 in accordance with the present invention.
Figure 10:
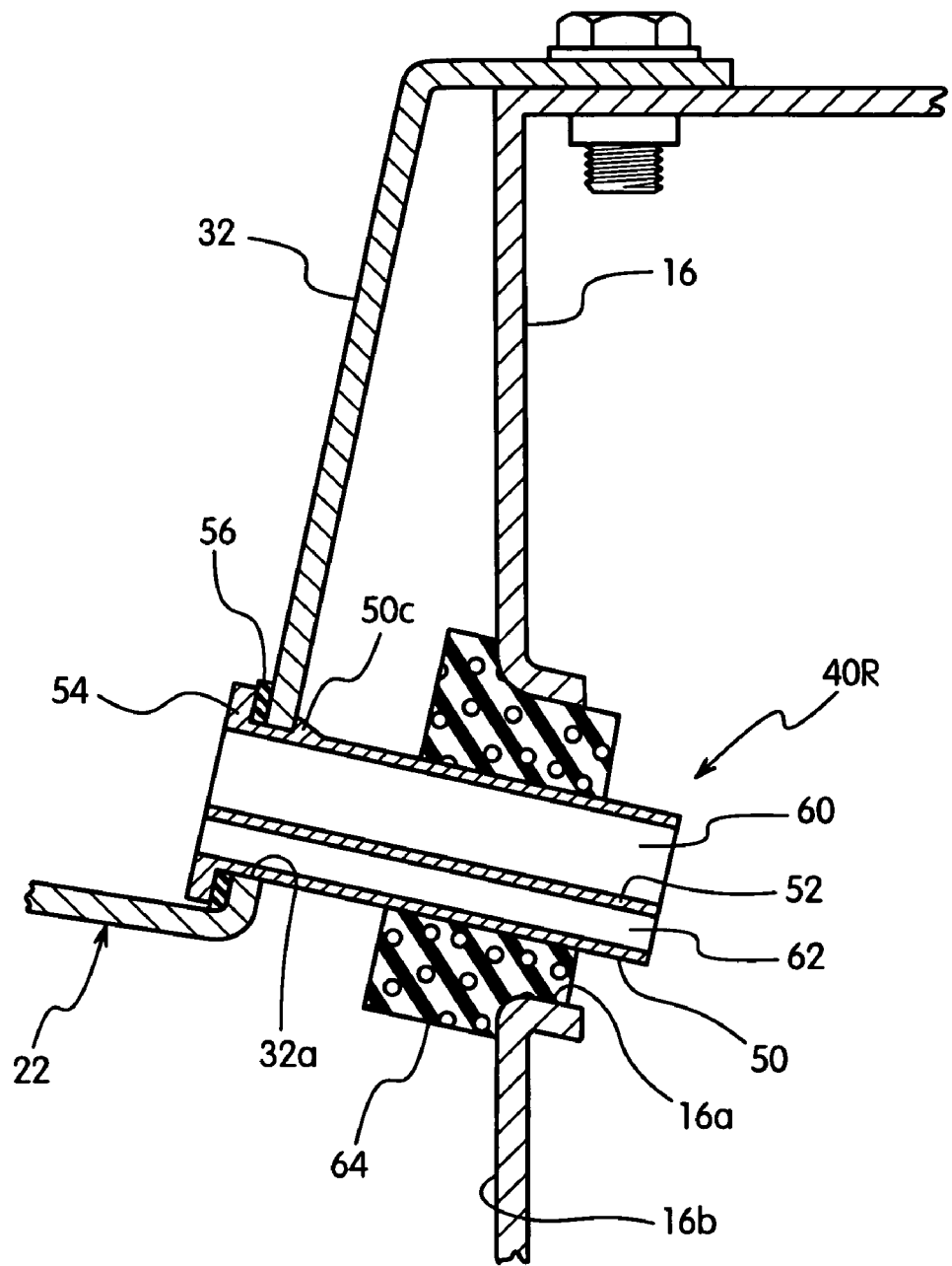
FIG. 10 is a partial schematic cross sectional view of the right hand portion of the cowl panel and the vent pipe coupled to the right hand side hood ledge illustrated in FIGS. 2 and 3 as seen along section line 10—10 of FIG. 6.

Basically, as seen in FIGS. 8 and 9, the vent pipe 40L includes a tubular portion 50 with a longitudinally extending divider 52 located therein and a radially extending mounting flange 54. Preferably, the vent pipe 40L is constructed as a one-piece, unitary member from a hard rigid material such as a hard rigid plastic material. Preferably, the vent pipe 40L is provided with an O-ring seal or gasket 56 that overlies the mounting flange 54. The O-ring seal 56 is sandwiched between the mounting flange 54 and the lateral end wall section 34 of the cowl panel 22 to provide a water tight seal therebetween.

The tubular portion 50 has a first end 50a with the mounting flange 54 extending radially outwardly therefrom and a second end 50b that is to be received in a portion of the left hood ledge 16 as discussed later. The divider 52 extends longitudinally through the axial opening of the tubular portion 50 so as to split the axial opening of the tubular portion 50 into an upper air passageway 60 and a lower water passageway 62. The tubular portion 50 preferably has a non-circular cross sectional shape so that the orientation of the vent pipe 40L can be inserted in only one orientation relative to the cowl panel 22. In other words, the tubular portion 50 and the second drainage aperture 34a are keyed to insure the correct orientation therebetween. Thus, the tubular portion preferably has a D-shaped outer configuration that is equal to or slightly smaller than the second drainage aperture 34a. Of course, it will be apparent for those skilled in the art from this disclosure that the shape of the tubular portion 50 can be changed as needed or desired. For example, the tubular portion 50 could have a circular cross section. Of course, the drainage aperture 34a of the cowl panel 22 will also be modified to have an opening that substantially mates with the cross sectional shape of the tubular portion 50. In other words, if the cross sectional shape of the tubular portion 50 is circular, then the corresponding drainage aperture 34a would also be circular.

Preferably, the divider 52 is disposed in the tubular portion 50 such that the upper air passageway 60 has a larger cross sectional area than the lower water passageway 62. Of course, the precise cross sectional areas of the upper air passageway 60 and the lower water passageway 62 can be adjusted according to the air requirement of the particular vehicle as well as the required draining rate for the cowl panel 22 of the particular vehicle. Since the drain pipe 40R and 40L includes the separated upper air passageway 60 and the lower water passageway 62, the cowl structure 12 can effectively drain the water collected on the cowl panel 22 from the cowl structure 12 through the lower water passageway 62 while the outside air being sucked into the cowl structure 12 through the upper air passageway 60.

The first end 50a of the tubular portion 50 preferably includes three circumferentially spaced apart retaining projections 50c that are spaced axially away from the mounting flange 54 via distance that is slightly larger than the thickness of the second lateral end wall 34 of the cowl panel 22. The retaining projections are preferably ramp-shaped in the axial direction for easy insertion of the vent pipe 40L into the drainage aperture 34a. When the vent pipe 40L is inserted into the drainage aperture 34a, the O-ring seal 56 is compressed and the second lateral end wall 34 is retained between the retaining projections 50c and the mounting flange 54 with the seal 56 in the compressed condition.

The mounting flange 36 of the cowl panel 22 preferably has a plurality of apertures for attaching the cowl panel 22 to various structures of vehicle body 10. In the illustrated embodiment, the mounting flange 36 is at least formed at the two lateral end wall sections 32 and 34 for attachment to the right and left hood ledges 16.

Figure 11:
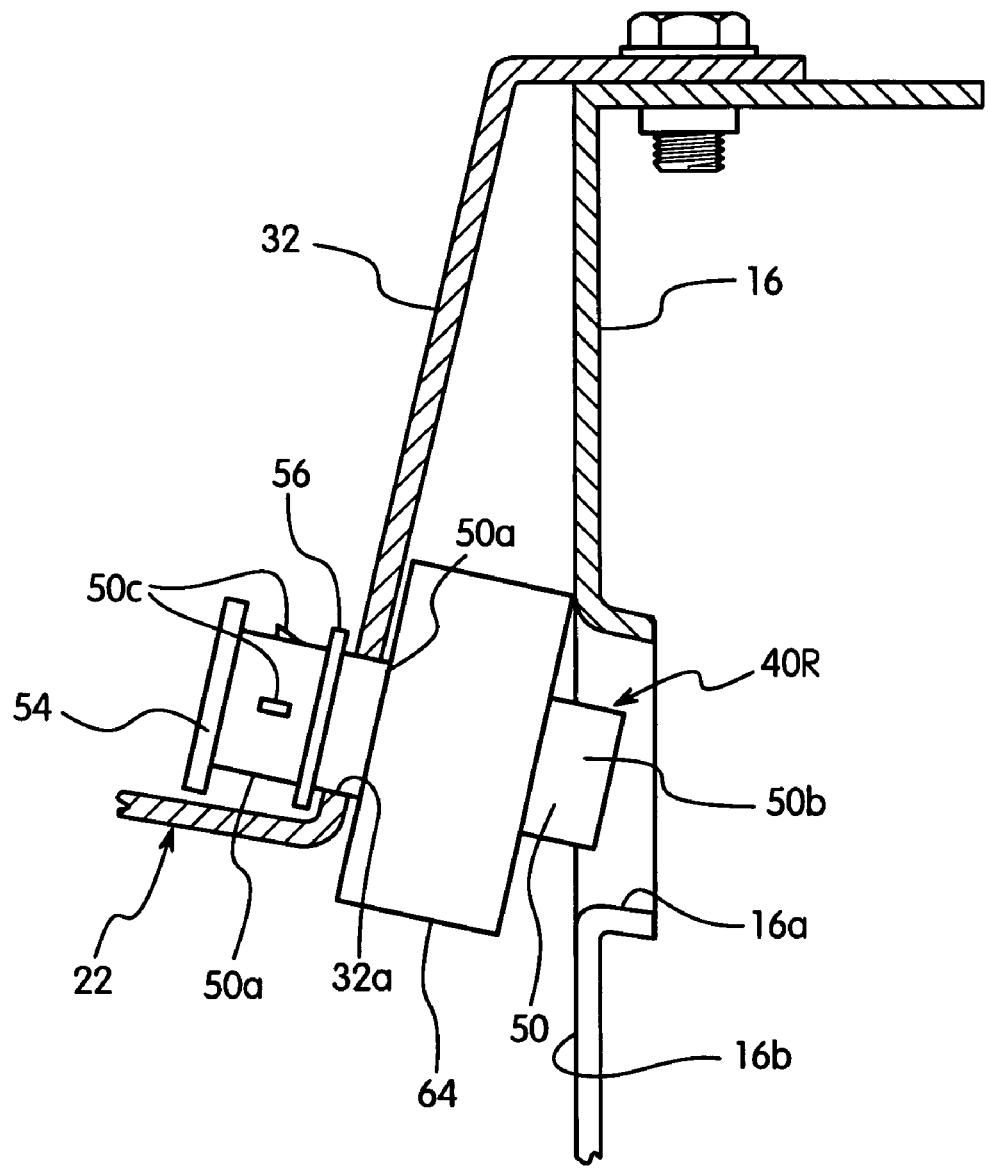
FIG. 11 is a schematic elevational view of the right hand portion of the cowl panel coupled to the right hand side hood ledge in which the vent pipe is loosely retained in the cowl panel before being non-movably coupled to the cowl panel in accordance with the present invention.
Figure 12:
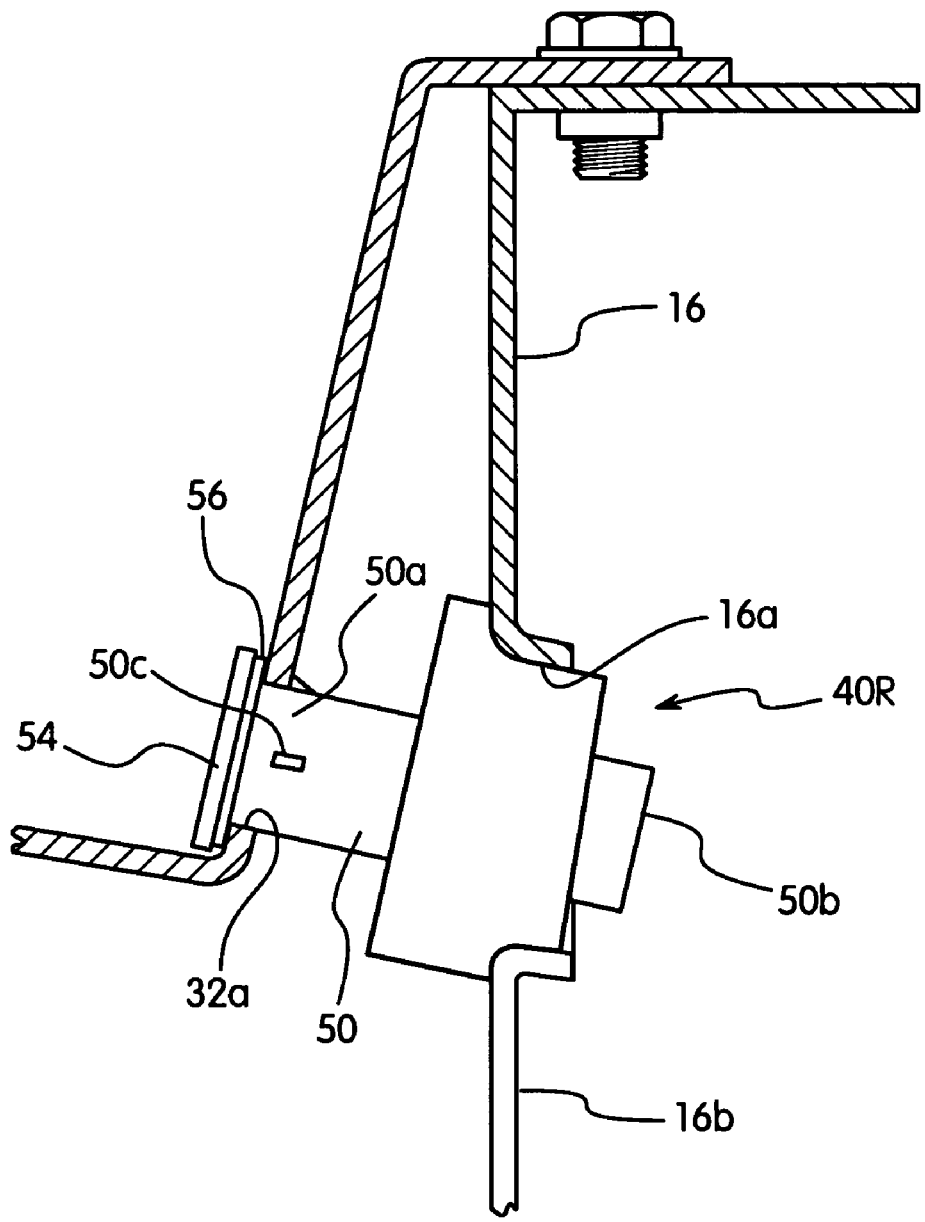
FIG. 12 is a schematic elevational view of the right hand portion of the cowl panel coupled to the right hand side hood ledge in which the vent pipe is non-movably coupled to the cowl panel and the right hand side hood ledge.

FIGS. 11 and 12 illustrate installation of the cowl panel 22 with the vent pipe 44R into the hood ledge 16 of the vehicle body 10. As seen in FIG. 11, when installing the cowl panel 22 in the vehicle body 10, the vent pipe 40R is partially preassembled to the cowl panel 22 prior to the cowl panel 22 being attached to the vehicle body 10. In particular, the first vent pipe 40R is inserted into the first drainage aperture 32a prior to mounting the cowl panel 22 to the hood ledges 16. However, the vent pipe 40R is not inserted to the point where the retaining projections 50c engage the first lateral end wall section 32 of the cowl panel 22. Rather, a tubular retaining member 64 is used for retaining the drainage tube 40R to the cowl panel 22. In particular, the retaining member 64 is inserted over the second end 50b of the tubular portion 50 of the vent pipe 40R such that the drain tube 40R is loosely retained within the first drainage aperture 32a. Preferably, the retaining member 64 also function as a sealing member for creating a seal with the hood ledges 16 when the cowl panel 22 is attached to the hood ledges 16 and the vent pipe 40R is fully inserted into the drainage aperture 32a. Preferably, the retaining member 64 is created of a resilient form type material that is compressible. The vent pipe 40L is also inserted into the second drainage aperture 34a of the second lateral end wall section 34 of the cowl panel 22 in the same manner as the vent pipe 40R. In other words, the second vent pipe 40L is loosely retained within the second drainage aperture 34a as an additional retaining member 64 is inserted over the second end 50b of the tubular portion 50 of the vent pipe 40L.

Once the vent pipes 40R and 40L are attached to the cowl panel 22 by the retaining member 64, the cowl panel 22 is ready to be installed in the vehicle body 10. Accordingly, the cowl panel 22 is attached to the hood ledge 16 via conventional fasteners. Once the cowl panel 22 is fixed relative to the hood ledges 16, the vent pipes 40R and 40L are now fully inserted into the first and second drainage apertures 32a and 34a as shown in FIG. 12 (only the vent pipe 40R is shown). This full insertion of the vent pipes 40R and 40L result in the retaining projections 50c engaging the lateral end wall sections 32 and 34 so that the vent pipes 40R and 40L are fixedly secured to the cowl panel 22 via a snap fit. Of course, this snap fit connection results in the O-ring seal 56 being compressed between the mounting flanges 54 and the respective lateral end wall sections 32 and 34.

By fully inserting the vent pipes 40R and 40L into the drainage apertures 32a and 34a, the second ends 50b of the tubular portion 50 of each vent pipes 40R and 40L are received in a hole 16a of the hood ledges 16 as seen in FIG. 12 (only the right hand side hood ledge 16 is shown). The insertion of the vent pipes 40R and 40L through the hole 16a of the hood ledges 16 result in the retaining members 64 being compressed against the walls 16b of the hood ledges 16 that contain the openings or holes 16a.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vent pipe for a vehicle cowl structure, comprising:
    a tubular portion having a first end, a second end and an axial opening extending between the first and second ends;
    a divider disposed in the tubular portion that is configured and arranged to split the axial opening of the tubular portion into an upper passageway and a lower passageway; and
    a mounting flange coupled to the first end of the tubular portion to extend substantially in a radial direction relative to the axial opening of the tubular portion.

2. The vent pipe according to claim 1, wherein
    the upper passageway has an upper cross sectional area that is larger than a lower cross sectional area of the lower passageway.

3. The vent pipe according to claim 1, wherein
    the first end of the tubular portion further includes at least one retaining projection axially spaced from the mounting flange.

4. The vent pipe according to claim 3, wherein
    the first end of the tubular portion has a sealing ring disposed between the at least one retaining projection and the mounting flange.

5. The vent pipe according to claim 3, wherein
    the at least one retaining projection includes a plurality of retaining projections that are spaced apart about the circumference of the tubular portion.

6. The vent pipe according to claim 5, wherein
    the first end of the tubular portion has a sealing ring disposed between the retaining projections and the mounting flange.

7. The vent pipe according to claim 1, wherein
    the tubular portion has a non-circular cross sectional shape.

8. The vent pipe according to claim 1, wherein
    the tubular portion, the divider and the mounting flange are integrally formed as a one-piece, unitary member.

9. A vehicle cowl structure comprising:
    a cowl panel configured to be installed in an area of a vehicle that is located between a vehicle hood and a vehicle windshield; and
    a first vent pipe disposed in the cowl panel at a first low drainage point, the first vent pipe having an opening that is split by a first divider into a first upper passageway and a first lower passageway, and the first vent pipe including a tubular portion extending from a first drainage aperture of the cowl panel in a direction below a horizontal direction.

10. The vehicle cowl structure according to claim 9, further comprising
    a second vent pipe disposed in the cowl panel at a second low drainage point, the second vent pipe having an opening that is split by a second divider into a second upper passageway and a second lower passageway.

11. The vehicle cowl structure according to claim 9, wherein
    the first upper passageway has an upper cross sectional area that is larger than a lower cross sectional area of the first lower passageway.

12. The vehicle cowl structure according to claim 9, wherein
    the cowl panel includes a bottom wall portion with a first lateral end and a second lateral end; and
    the first vent pipe is disposed in an area of the first lateral end that includes the first low drainage point.

13. The vehicle cowl structure according to claim 12, further comprising
    a second vent pipe disposed in the cowl panel at a second low drainage point disposed in an area of the second lateral end, the second vent pipe having an opening that is split by a second divider into a second upper passageway and a second lower passageway.

14. A vehicle cowl structure comprising:
    a cowl panel configured to be installed in an area of a vehicle that is located between a vehicle hood and a vehicle windshield, the cowl panel including a bottom wall portion with a first lateral end and a second lateral end;
    a first vent pipe disposed in an area of the first lateral end that includes a first low drainage point, the first vent pipe having an opening that is split by a first divider into a first upper passageway and a first lower passageway; and
    a second vent pipe disposed in the cowl panel at a second low drainage point disposed in an area of the second lateral end, the second vent pipe having an opening that is split by a second divider into a second upper passageway and a second lower passageway,
    the first and second vent pipes being disposed in first and second drainage apertures of the cowl panel, respectively, and each of the first and second vent pipes including a tubular portion extending through a corresponding one of the first and second drainage apertures and a mounting flange arranged adjacent an interior surface of the cowl panel.

15. The vehicle cowl structure according to claim 14, wherein
the cowl panel further includes a first lateral wall portion extending upwardly from the first lateral end of the bottom wall portion and a second lateral end portion extending upwardly from the second lateral end of the bottom wall portion, and
the first and second drainage apertures are disposed in the first and second lateral wall portions, respectively.

16. The vehicle cowl structure according to claim 15, wherein
the first and second upper passageways have upper cross sectional areas that are larger than lower cross sectional areas of the first and second lower passageways.

17. A vehicle cowl structure comprising:
a cowl panel configured to be installed in an area of a vehicle that is located between a vehicle hood and a vehicle windshield; and
a first vent pipe disposed in the cowl panel at a first low drainage point, the first vent pipe having an opening that is split by a first divider into a first upper passageway and a first lower passageway, the first vent pipe being disposed in a first drainage aperture of the cowl panel, and the first vent pipe including a tubular portion extending through the first drainage aperture and a mounting flange arranged adjacent an interior surface of the cowl panel.

18. The vehicle cowl structure according to claim 17, wherein
the tubular portion includes at least one retaining projection that is configured and arranged to create a snap-fit between the tubular portion and the first drainage aperture of the cowl panel.

19. The vehicle cowl structure according to claim 18, wherein
the tubular portion has a sealing ring disposed between the at least one retaining projection and the mounting flange.

20. The vehicle cowl structure according to claim 19, wherein
the at least one retaining projection includes a plurality of retaining projections that are spaced apart about the circumference of the tubular portion.

21. The vehicle cowl structure according to claim 17, wherein
the tubular portion has a non-circular cross sectional shape.

22. The vehicle cowl structure according to claim 17, wherein
the tubular portion, the divider and the mounting flange are integrally formed as a one-piece, unitary member.

23. A vehicle installation method comprising:
providing a first vent pipe including a tubular portion having a first end with a mounting flange, a second end and an axial opening extending between the first and second ends;
providing a vehicle cowl structure including a cowl panel having a first drainage aperture disposed at a first low drainage point of the cowl panel;
inserting the second end of the first vent pipe through the first drainage aperture in the cowl panel such that the mounting flange is disposed on an interior side of the vehicle cowl structure that receives water to be drained; and
installing a first retaining member over the second end of the first vent pipe after the first vent pipe has been inserted through the first drainage aperture in the cowl panel such that the first vent pipe is retained in the first drainage aperture in the cowl panel by the first retaining member.

24. The vehicle installation method according to claim 23, wherein
the inserting the second end of the first vent pipe through the first drainage aperture in the cowl panel results in a divider of the first vent pipe being arranged to form a first upper passageway and a first lower passageway.

25. The vehicle installation method according to claim 23, wherein
attaching the cowl panel to a vehicle body; and
inserting the second end of the first vent pipe through a first hole formed in a first vehicle body section of the vehicle body such that the first retaining member contacts the first vehicle body section around the first hole.

26. The vehicle installation method according to claim 23, further comprising
providing a second vent pipe including a tubular portion having a first end with a mounting flange, a second end and an axial opening extending between the first and second ends of the second vent pipe;
inserting the second end of the second vent pipe through a second drainage aperture in the cowl panel such that the mounting flange of the second vent pipe is disposed on the interior side of the vehicle cowl structure; and
installing a second retaining member over the second end of the second vent pipe after the second vent pipe has been inserted through the second drainage aperture in the cowl panel such that the second vent pipe is retained in the second drainage aperture in the cowl panel by the second retaining member.

27. The vehicle installation method according to claim 26, wherein
the inserting the second end of the first vent pipe through the first drainage aperture in the cowl panel results in a first divider of the first vent pipe being arranged to form a first upper passageway and a first lower passageway; and
the inserting the second end of the second vent pipe through the second drainage aperture in the cowl panel results in a second divider of the second vent pipe being arranged to form a second upper passageway and a second lower passageway.

28. The vehicle installation method according to claim 27, wherein
attaching the cowl panel to a vehicle body; and
inserting the second ends of the first and second vent pipes through first and second holes formed in first and second vehicle body sections of the vehicle body, respectively, such that the first and second retaining members contact the first and second vehicle body sections around the first and second holes.

29. The vehicle installation method according to claim 26, wherein
attaching the cowl panel to a vehicle body; and
inserting the second ends of the first and second vent pipes through first and second holes formed first and second vehicle body sections of the vehicle body, respectively, such that the first and second retaining members contact the first and second vehicle body sections around the first and second holes.

* * * * *